(12) United States Patent
Cheng

(10) Patent No.: US 8,322,866 B2
(45) Date of Patent: Dec. 4, 2012

(54) DUAL LAMP ILLUMINATION SYSTEM AND ITS VARIFOCAL LIGHT-MIXING DEVICE

(75) Inventor: Chuan-Te Cheng, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 321 days.

(21) Appl. No.: 12/757,627

(22) Filed: Apr. 9, 2010

(65) Prior Publication Data

US 2010/0290224 A1 Nov. 18, 2010

(30) Foreign Application Priority Data

May 13, 2009 (TW) .............................. 98115774 A (51) Int. Cl.
*G03B 21/26* (2006.01)
(52) U.S. Cl. ........................................................ 353/94
(58) Field of Classification Search ................... 353/81, 353/94; 362/235–248; 359/676–692
See application file for complete search history.

(56) References Cited

U.S. PATENT DOCUMENTS

| | | | |
|---|---|---|---|
| 3,973,831 A * | 8/1976 | Minoura | 359/679 |
| 6,224,217 B1 | 5/2001 | Tanaka | |
| 6,765,727 B1 | 7/2004 | Chang | |
| 7,125,144 B2 | 10/2006 | Shimaoka | |
| 7,182,468 B1 | 2/2007 | Haven | |
| 7,201,498 B2 * | 4/2007 | Shimaoka et al. | 362/319 |
| 7,222,975 B2 * | 5/2007 | Lin | 353/94 |
| 2006/0109434 A1 * | 5/2006 | Penn et al. | 353/122 |
| 2008/0247164 A1 * | 10/2008 | Lee et al. | 362/241 |

FOREIGN PATENT DOCUMENTS

| | | |
|---|---|---|
| TW | I288828 | 1/2003 |
| TW | I285293 | 1/2006 |
| TW | 200743822 | 5/2006 |

* cited by examiner

*Primary Examiner* — Thanh Luu
*Assistant Examiner* — Renee Naphas
(74) *Attorney, Agent, or Firm* — Muncy, Geissler, Olds & Lowe, PLLC (57) ABSTRACT

A dual lamp illumination system includes a first light source, a second light source, a light-deflecting device, a light-homogenizing device, and a lens assembly. The light-deflecting device is positioned in both a first light path of the first light beam and a second light path of the second light beam to combine the first light beam with the second light beam. The lens assembly includes a first set of varifocal lenses neighboring the light-deflecting device and a second set of varifocal lenses neighboring the light-homogenizing device. The composition of the first set of varifocal lenses is identical to the composition of the second set of varifocal lenses, and the first set of varifocal lenses and the second set of varifocal lenses are positioned substantially in symmetry.

17 Claims, 10 Drawing Sheets

| | movement in X-axis (mm) | movement in Z-axis (mm) | light flux on light Input end of intergration rod | light flux on projection screen | ratio |
|---|---|---|---|---|---|
| Single lamp illumination system | no light-combining prism | | 72.99 | 62.304 | 100.00% |
| Dual lamp illumination system where only one lamp is tured on (Prism is not shifted) | 0 | 6.0 | 65.14 | 50.639 | 81.28% |
| Dual lamp illumination system where only one lamp is tured on (Prism is shifted in X-axis and Z-axis) | -1.5 | 1.5 | 71.14 | 55.839 | 89.62% |
| | -2.0 | 2.0 | 71.73 | 56.343 | 90.43% |
| | -2.5 | 2.5 | 72.00 | 56.574 | 90.80% |
| | -3.0 | 3.0 | 72.14 | 56.690 | 90.99% |
| | -3.5 | 3.5 | 72.23 | 56.770 | 91.12% |
| | -4.5 | 4.5 | 72.33 | 56.833 | 91.22% |
| | -5.0 | 5.0 | 72.31 | 56.837 | 91.23% |
| | -5.5 | 5.5 | 72.23 | 56.836 | 91.22% |
| | -6.0 | 6.0 | 72.03 | 56.792 | 91.15% |
| | -4.0 | 2.0 | 76.92 | 60.485 | 97.08% |

FIG. 11 ical Light-Mixing Device

DUAL LAMP ILLUMINATION SYSTEM AND ITS VARIFOCAL LIGHT-MIXING DEVICE

BACKGROUND OF THE INVENTION a. Field of the Invention

The invention relates to a dual lamp illumination system, and particularly to a dual lamp illumination system having varifocal lenses.

b. Description of the Related Art

Figure 1:
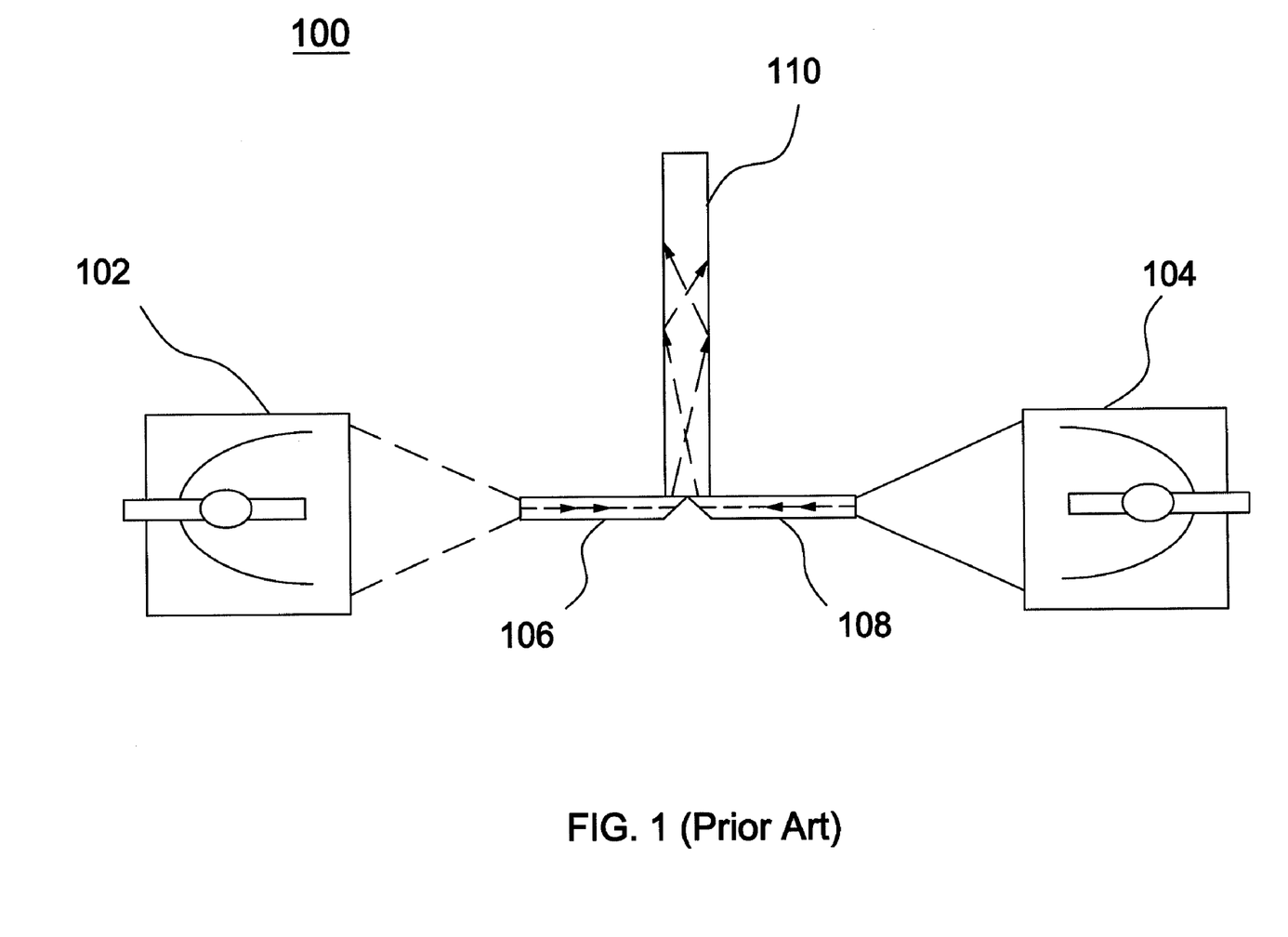
FIG. 1 shows a schematic diagram illustrating a conventional dual lamp illumination system.

FIG. 1 shows a schematic diagram of a dual lamp illumination system 100 disclosed in U.S. Pat. No. 7,182,468. As shown in FIG. 1, an integration rod 106 receives emitting light of a left-side light source 102 and guides the light into another integration rod 110, and an integration rod 108 receives emitting light of a right-side light source 104 and also guides the light into the same integration rod 110. Hence, the light beam from different light sources are combined together and then propagate in the same direction. However, the emitting light of the left-side light source 102 goes into the integration rod 110 via a first entrance equal to half of an light incident surface of the integration rod 110, and the emitting light of the right-side light source 104 goes into the integration rod 110 via a second entrance equal to the remaining half of the light incident surface of the integration rod 110. Hence, a light collection angle and a light collection area of the integration rod 110 fail to be increased to result in inferior light collection efficiency. Accordingly, another conventional design is proposed to solve the problem.

Figure 2:
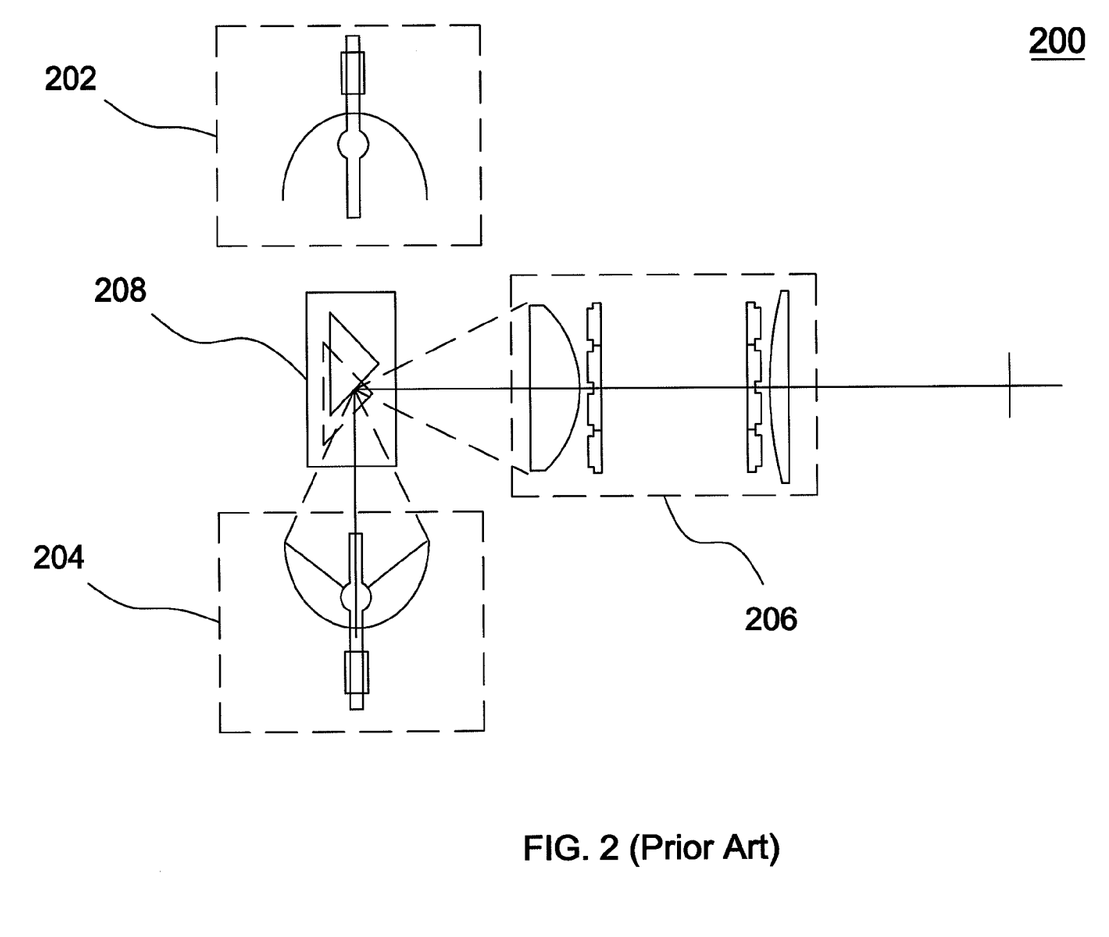
FIG. 2 shows a schematic diagram illustrating another conventional dual lamp illumination system.
Figure 3:
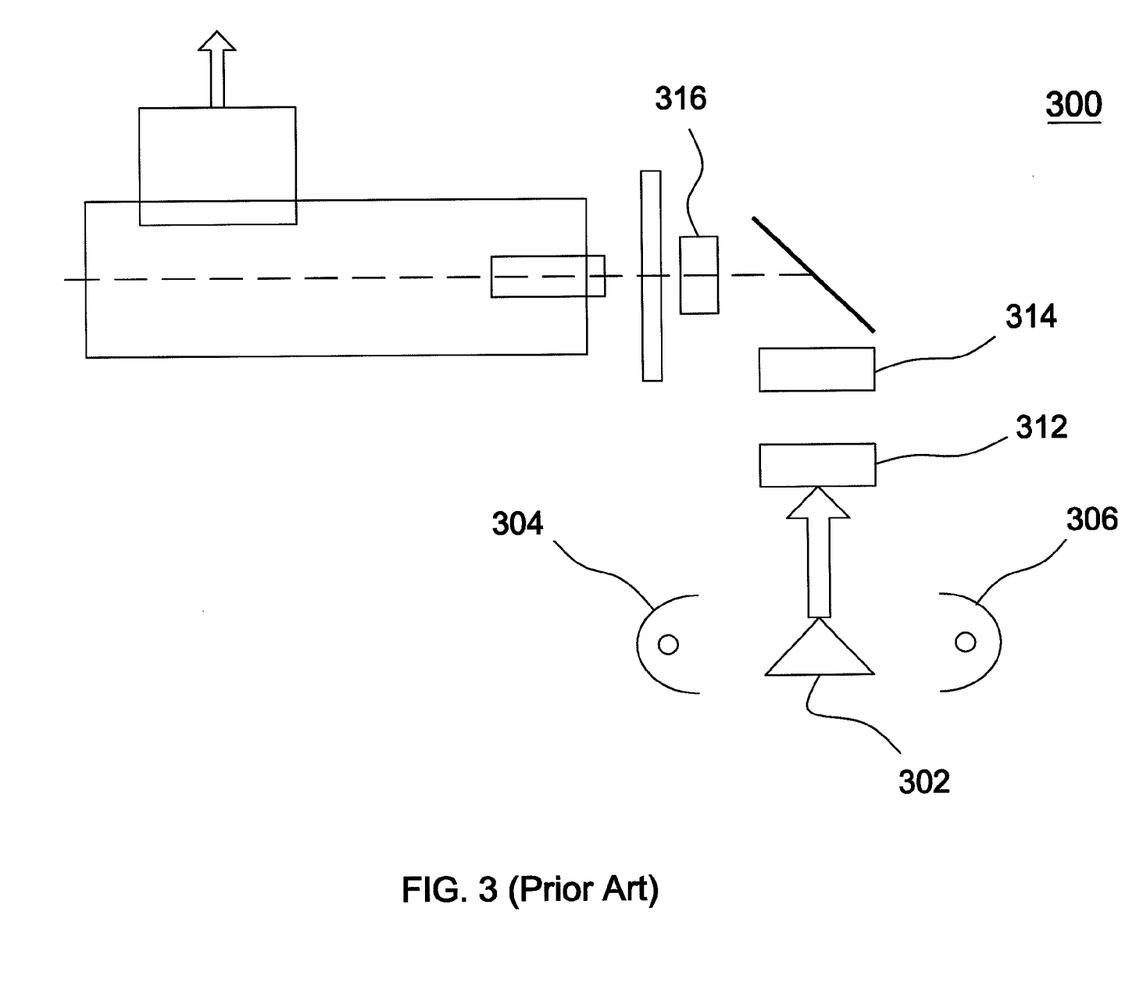
FIG. 3 shows a schematic diagram illustrating another conventional dual lamp illumination system.

Referring to FIG. 2, U.S. Pat. No. 7,201,498 discloses a dual lamp illumination system 200 that includes light sources 202 and 204, light-combining lens assembly 206, and a movable reflective prism 208. However, though the effect of combining light beams transmitted from different directions is optimized through the movement of the reflective prism 208, the light collection angle fails to be further increased to improve luminous efficiency. Besides, referring to FIG. 3, Taiwan patent publication no. 200743822 discloses a dual lamp illumination system 300 that includes a light-combining prism 302, light sources 304 and 306, and condenser lenses 312, 314 and 316. The light-combining prism 302 reflects emitting light beam of light sources 304 and 306, and the condenser lenses 312, 314 and 316 are allowed to enhance the effect of combining light beams from the light sources 304 and 306. Similar designs are disclosed, for example, in U.S. Pat. No. 6,224,217 and U.S. Pat. No. 7,125,144, where each illumination system includes a light-combining prism and a lens assembly. However, such designs fail to achieve optimum luminous efficiency and output brightness, when only one lamp in a dual lamp illumination system is turned on.

BRIEF SUMMARY OF THE INVENTION

The invention provides a dual lamp illumination system and a varifocal light mixing device having an optimum light collection angle and high luminous efficiency.

Other objects and advantages of the present invention may be further illustrated by the technical features broadly embodied and described as follows.

In order to achieve one or a portion of or all of the objects or other objects, one embodiment of the present invention provides a dual lamp illumination system. The dual lamp illumination includes a first light source, a second light source, a light-deflecting device, a light-homogenizing device, and a lens assembly. The first light source and the second light source are located in different positions, and the first light source is capable of emitting a first light beam and the second light source is capable of emitting a second light beam. The light-deflecting device is positioned in a first light path of the first light beam to reflect the first light beam and in a second light path of the second light beam to reflect the second light beam, so that the first light beam are combined with the second light beam to form combined light beam. The light-homogenizing device is capable of receiving and homogenizing the combined light beam, and the lens assembly is disposed between the light-deflecting device and the light-homogenizing device. The lens assembly includes a first set of varifocal lenses neighboring the light-deflecting device and a second set of varifocal lenses neighboring the light-homogenizing device. The composition of the first set of varifocal lenses is identical to the composition of the second set of varifocal lenses, and the first set of varifocal lenses and the second set of varifocal lenses are positioned substantially in symmetry.

According to another embodiment of the invention, a varifocal light-mixing device includes a light-deflecting device, a light-homogenizing device, and a lens assembly. The light-deflecting device has a first side surface facing a first light source and a second side surface facing a second light source. The light-deflecting device is positioned in one of a first light path of a first light beam emitted from the first light source and a second light path of a second light beam emitted from the second light source to reflect one of the first light beam and the second light beam. The light-homogenizing device is capable of receiving and homogenizing one of the first light beam and the second light beam, and the lens assembly is disposed between the light-deflecting device and the light-homogenizing device to adjust a light collection angle of the light-homogenizing device. The lens assembly includes a first set of varifocal lenses neighboring the light-deflecting device and a second set of varifocal lenses neighboring the light-homogenizing device. The composition of the first set of varifocal lenses is identical to the composition of the second set of varifocal lenses, and the first set of varifocal lenses and the second set of varifocal lenses are positioned substantially in symmetry. The light-deflecting device is movable to adjust the light amount of one of the first light beam and the second light beam received by the light-homogenizing device.

In one embodiment, a first side surface of the light-deflecting device faces the first light source, a second side surface of the light-deflecting device faces the second light source, and each of the first side surface and the second side surface is applied with a reflective coating.

In one embodiment, the light-deflecting device is a light-combining prism, and the light-homogenizing device is an integration rod.

In one embodiment, the light-deflecting device is substantially positioned in a connecting line between the first light source and the second light source, and the combined light beam is capable of propagating in a first direction that is substantially perpendicular to the connecting line.

In one embodiment, the first set of varifocal lenses includes, numbered in order of location from the light-deflecting device to the light-homogenizing device, a first lens, and a second lens, and the second set of varifocal lenses includes, numbered in order of location from the light-deflecting device to the light-homogenizing device, a third lens, and a fourth lens. The first lens is identical to the fourth lens in structure, and the second lens is identical to the third lens in structure. The position of the first lens is fixed, and the positions of the second lens, the third lens, and the fourth lens are adjustable in the lens assembly.

The embodiment or the embodiments of the invention may have at least one of the following advantages. According to the above embodiments, when the focus of the lens assembly disposed between the light-deflecting device and the light-homogenizing device is adjusted, the light collection angle of the integration rod is allowed to be optimized to improve the luminous efficiency. Further, since the light-deflecting device is movable, the light-deflecting device may be shifted to an optimal position to maximize the light amount received by the light-homogenizing device, on the occasion that only one lamp of a dual lamp illumination system is turned on.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 8 shows a schematic diagram illustrating the method for improving the luminous efficiency of the dual lamp illumination system where only one lamp is turned on.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 4:
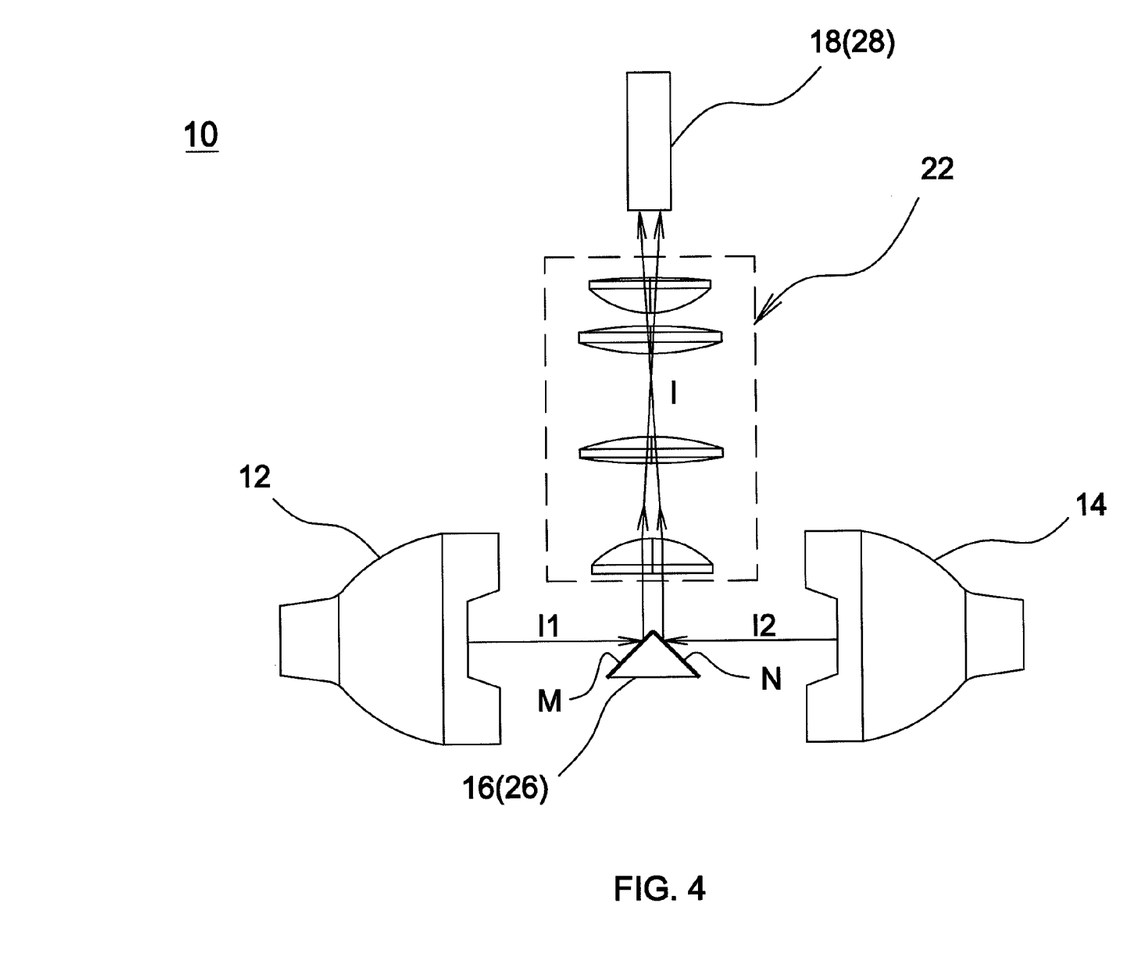
FIG. 4 shows a schematic diagram illustrating a dual lamp illumination system according to an embodiment of the invention.

Referring to FIG. 4, the dual lamp illumination system 10 includes a first light source 12 and a second light source 14 located in different positions, a light-deflecting device 16, a light-homogenizing device 18, and a lens assembly 22. The light-deflecting device 16 may be a light-combining prism 26, and the light-homogenizing device 18 may be an integration rod 28. In this embodiment, the light-combining prism 26 is substantially positioned in a connecting line between the first light source 12 and the second light source 14. The first light source 12 emits a first light beam I1, and the second light source 14 emits a second light beam I2. A side surface M of the light-combining prism 26 faces the first light source 12, and another side surface N of the light-combining prism 26 faces the second light source 14, with each of the side surfaces M and N being applied with a reflective coating. Hence, when the light-combining prism 26 is positioned in both a first light path of the first light beam I1 and a second light path of the second light beam I2, the light-combining prism 26 is allowed to reflect the first light beam I1 and the second light beam I2 and thus combine the first light beam I1 with the second light beam I2 to form a combined light beam I. The combined light beam I enters the integration rod 28 and is homogenized by the integration rod 28. In one embodiment, the side surface M and the side surface N of the light-combining prism 26 are substantially perpendicular to each other, and the propagation direction of the combined light beam I is substantially perpendicular to the connecting line between the first light source 12 and the second light source 14.

Figure 5:
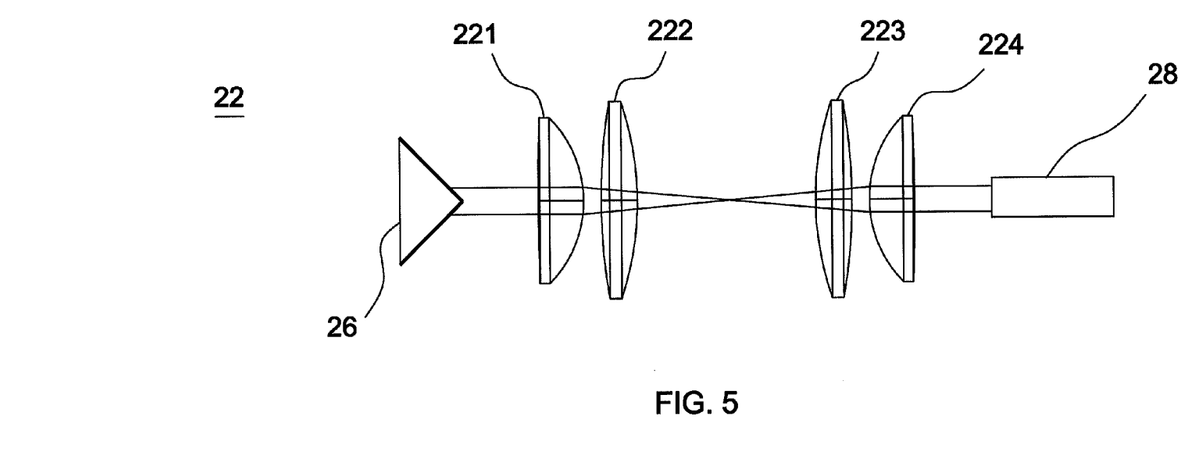
FIG. 5 and FIG. 6 illustrate the composition of the lens assembly and an adjustment to the focus of the lens assembly according to an embodiment of the invention.
Figure 6:
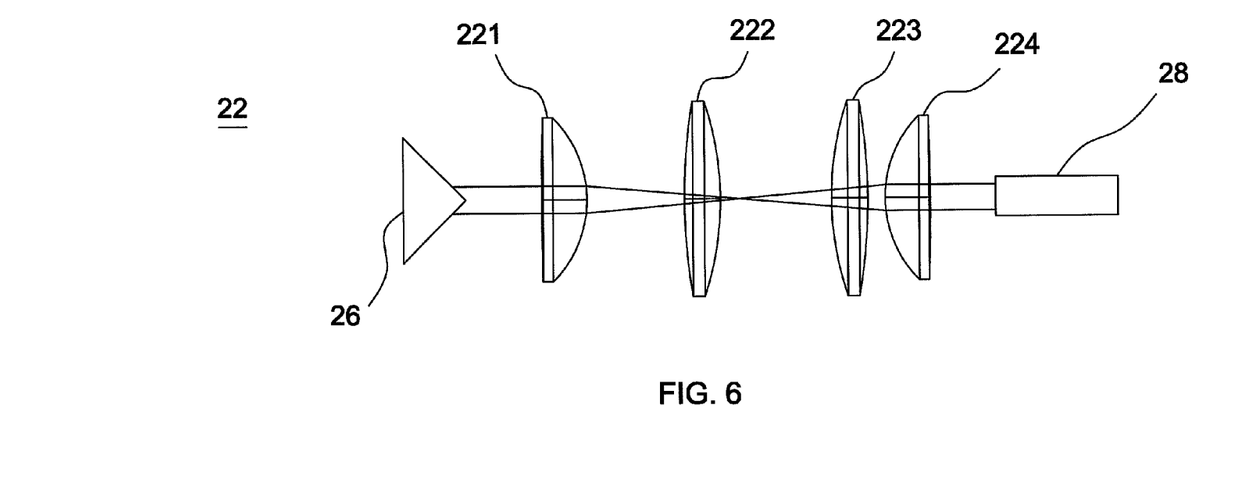
Figure 7A:
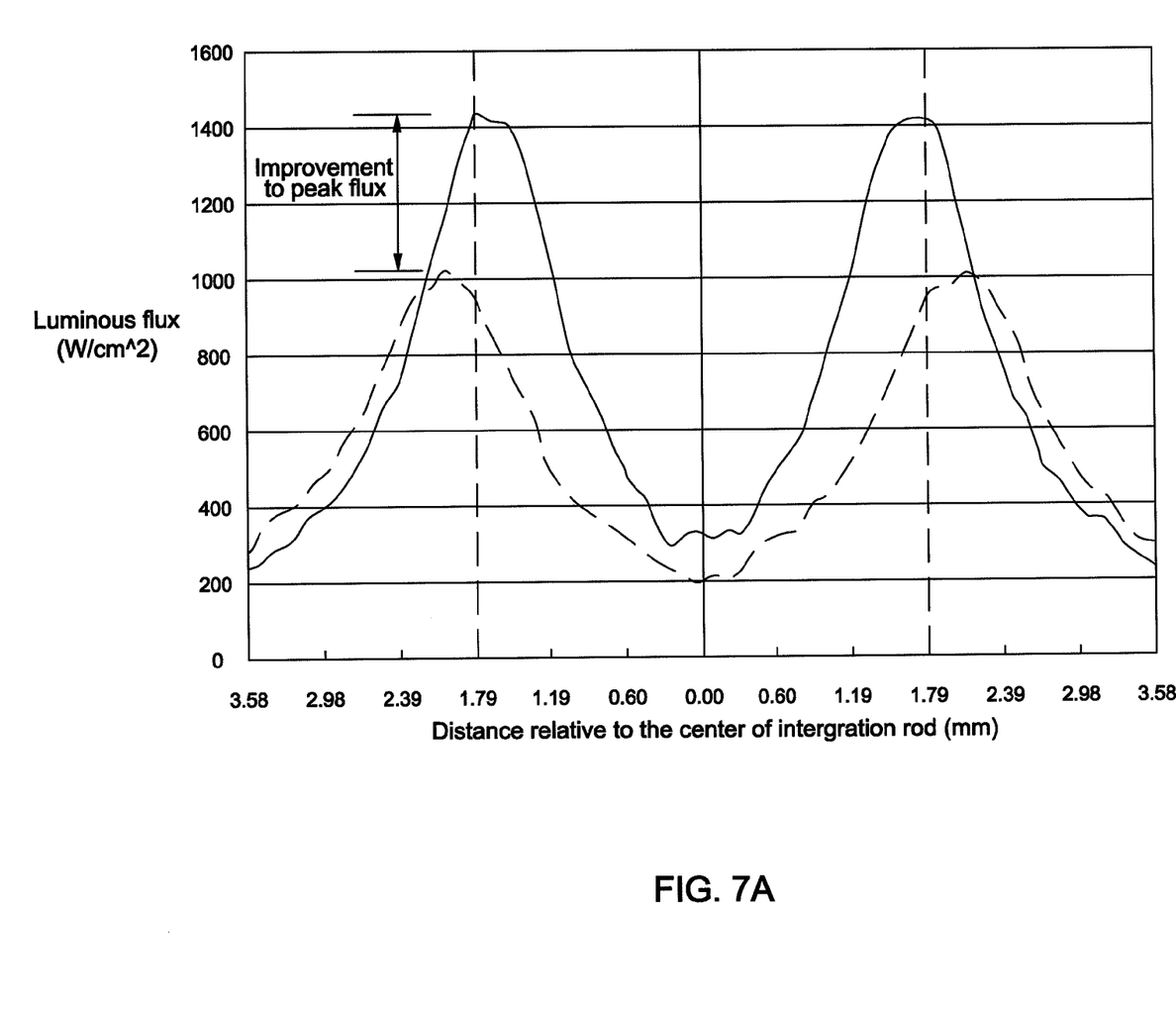
FIG. 7A shows a diagram illustrating the enhancement of luminous flux, where the adjustment to the focus of a lens assembly has been made.
Figure 7B:
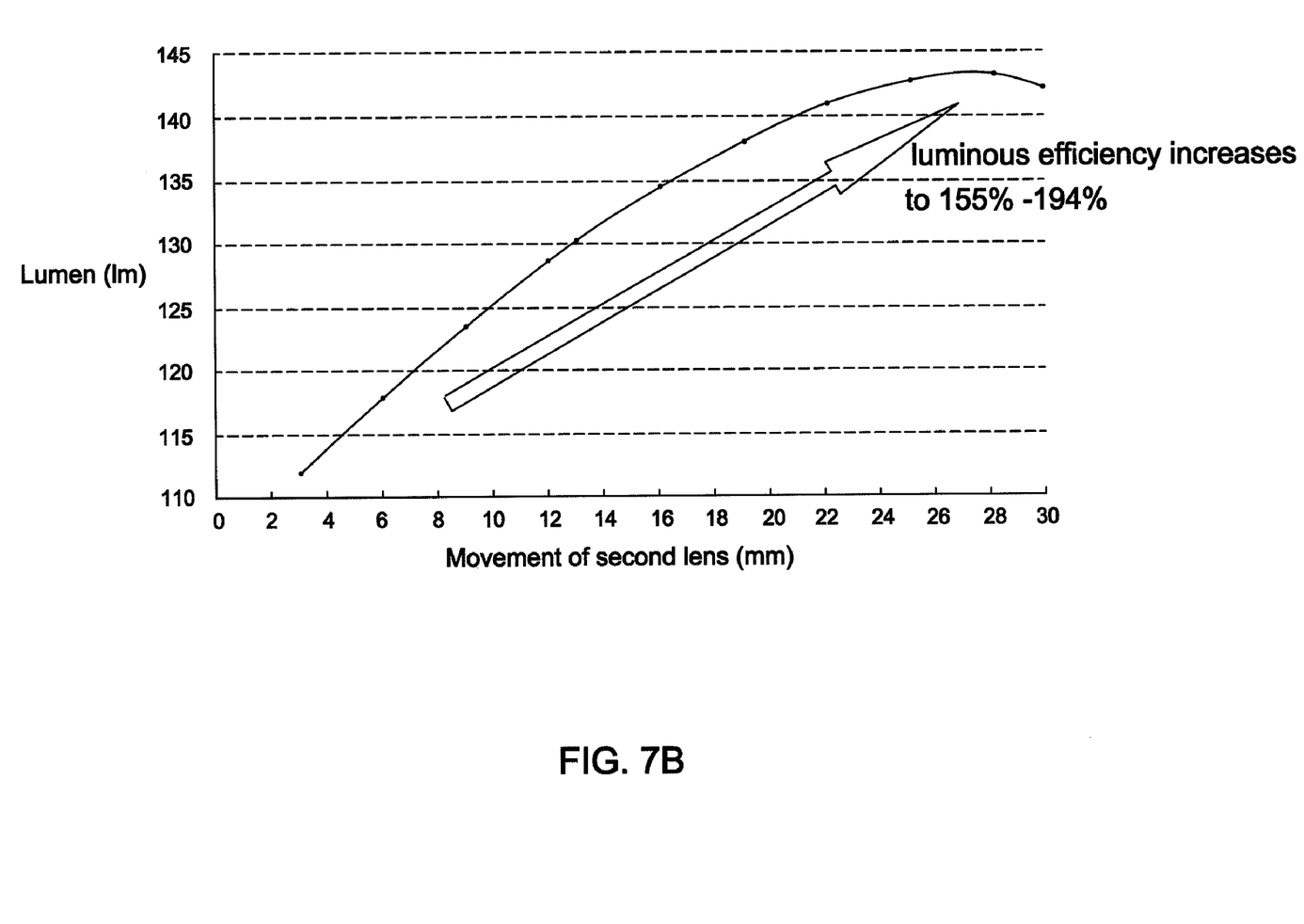
FIG. 7B shows a diagram illustrating the relationship between the movement of a second lens and the luminous flux of a light input end of an integration rod.

The lens assembly 22 is disposed between the light-combining prism 26 and the integration rod 28. FIG. 5 shows a schematic diagram of the lens assembly 22 in an initial condition where an adjustment to the focus of the lens assembly 22 is not made, and FIG. 6 shows a schematic diagram of the lens assembly 22 where the adjustment to the focus of the lens assembly 22 has been made. In this embodiment, the lens assembly 22 includes, numbered in order of location from the light-combining prism 26 to the integration rod 28, a first lens 221, a second lens 222, a third lens 223, and a fourth lens 224. The first lens 221 is identical to the fourth lens 224 in structure, and the second lens 222 is identical to the third lens 223 in structure. In other words, the lens assembly 22 includes two identical sets of varifocal lenses, and, as shown in FIG. 5, the two sets of varifocal lenses are positioned substantially in symmetry before the adjustment to the focus of the lens assembly 22 is made. In this embodiment, as shown in FIG. 6, the second lens 222, the third lens 223, and the fourth lens 224 are allowed to move to vary the focus of the lens assembly 22. Particularly, the position of the movable second lens 222 is a major factor in optimizing the light-condensing and hence the light collection angle of the integration rod 28 to improve the luminous efficiency. FIG. 7A shows a diagram illustrating the enhancement of luminous flux, where the adjustment to the focus of the lens assembly 22 has been made. By shifting the second lens 222, the third lens 223, and the fourth lens 224, the light collection angle of the integration rod 28 is optimized to effectively collect surrounding light beam towards the center of the integration rod 28. Hence, the peak luminous flux is allowed to be increased by 40% through the focus adjustment. Further, FIG. 7B shows a diagram illustrating the relationship between the movement of the second lens 222 and the luminous flux of a light input end of the integration rod 28. Referring to FIG. 7B, the luminous efficiency of the integration rod 28 according to a dual-lamp embodiment of the invention may increase to 155% -194%, compared with the luminous efficiency of a single lamp illumination system (100%). Hence, the dual lamp illumination system 10 has good light collection efficiency.

Figure 8:
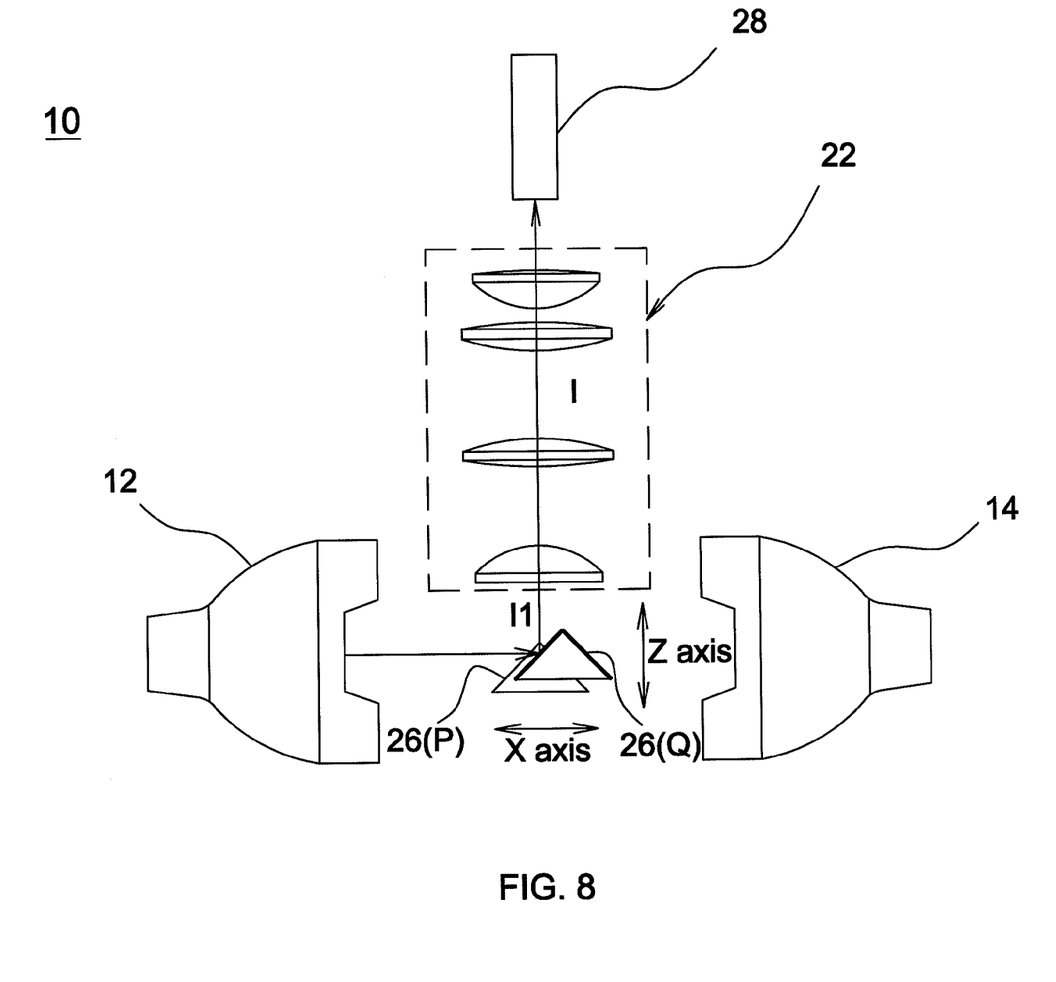
Figure 9:
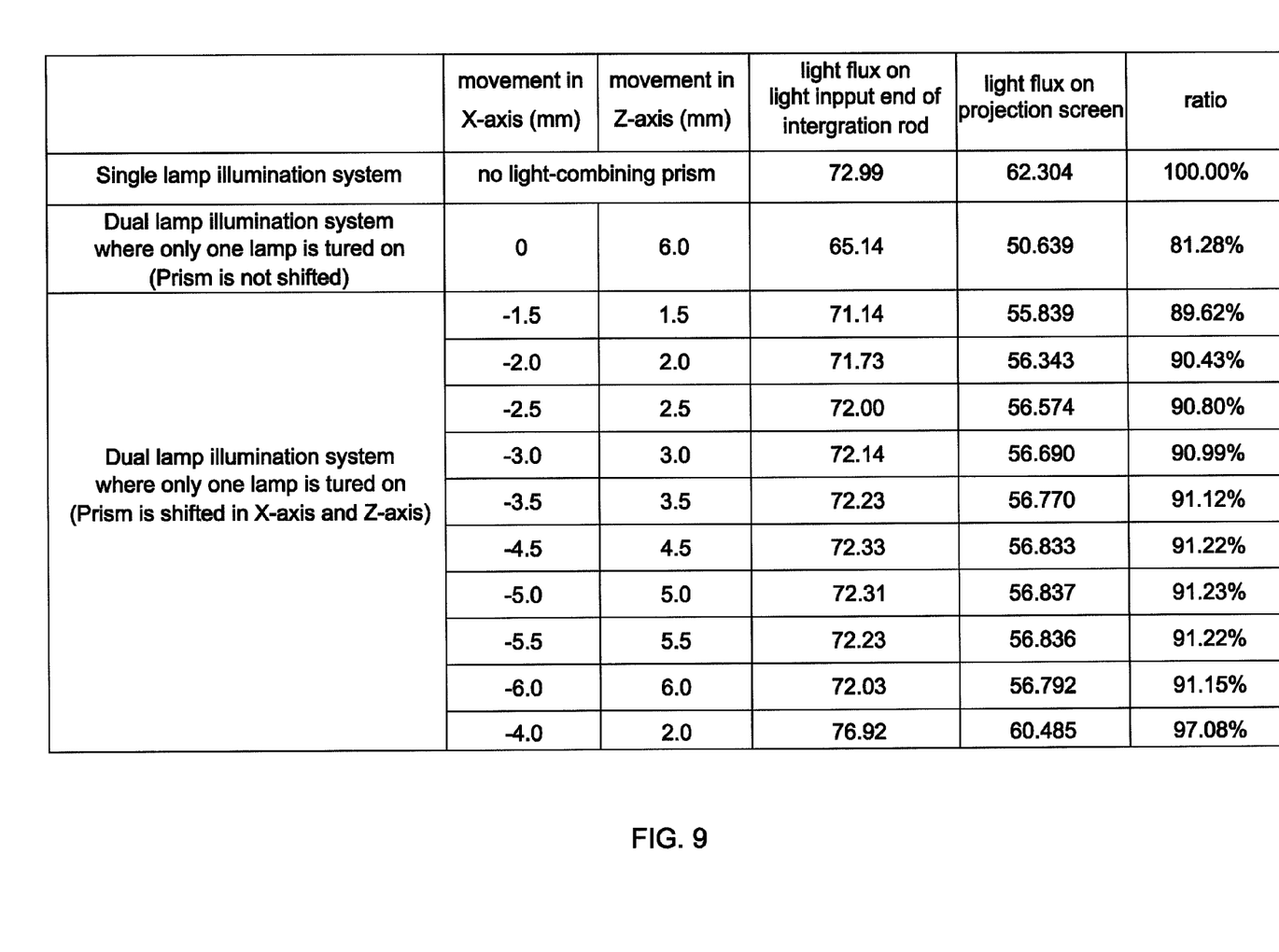
FIG. 9 lists comparison results of luminous flux under different movements of a light-combining prism.

Referring to FIG. 8, on the occasion that only one lamp (such as the first lamp 12) of the dual lamp illumination system 10 is turned on, the position of the light-combining prism 26 may be adjusted to increase the light amount received by the integration rod 28. For example, when the light-combining prism 26 is shifted from a position P to another position Q, the position and reflection angle of the light-combining prism 26 in relation to incoming light beam are optimized to increase the total light amount received by the integration rod 28. The light-combining prism 26 may be shifted in an X-axis direction parallel to a connecting line between the first light source 12 and the second light source 14 or in a Z-axis direction perpendicular to the connecting line. As shown in FIG. 9, the luminous efficiency of the dual lamp illumination system where only one lamp is turned on is up to about 97%, compared with the luminous efficiency of a single lamp illumination system (100%).

According to the above embodiments, the light-deflecting device, the light-homogenizing device and the lens assembly together form a varifocal light-mixing device. When the focus of the lens assembly disposed between the light-deflecting device and the light-homogenizing device is adjusted, the light collection angle of the integration rod 28 is allowed to be optimized to improve the luminous efficiency. Further, since the light-deflecting device is movable, the light-deflecting device may be shifted to an optimal position to maximize the light amount received by the light-homogenizing device, on the occasion that only one lamp of a dual lamp illumination system is turned on.

Figure 10:
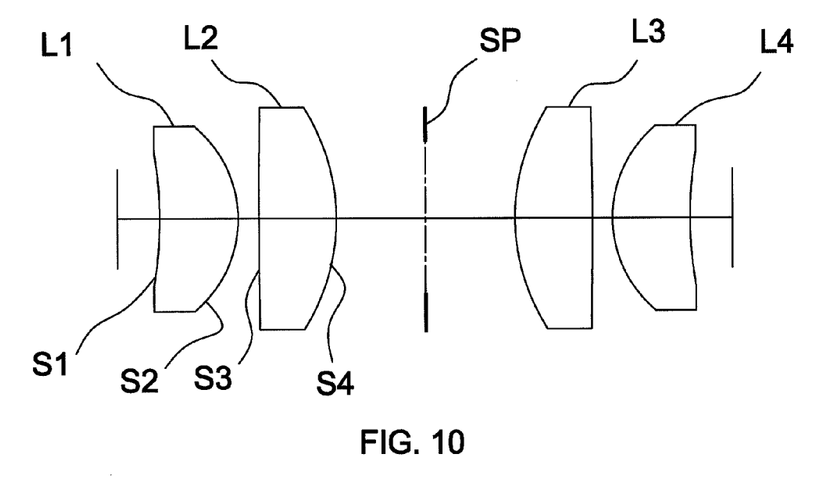
FIG. 10 and FIG. 11 are schematic diagrams illustrating different embodiments of a lens assembly.
Figure 11:
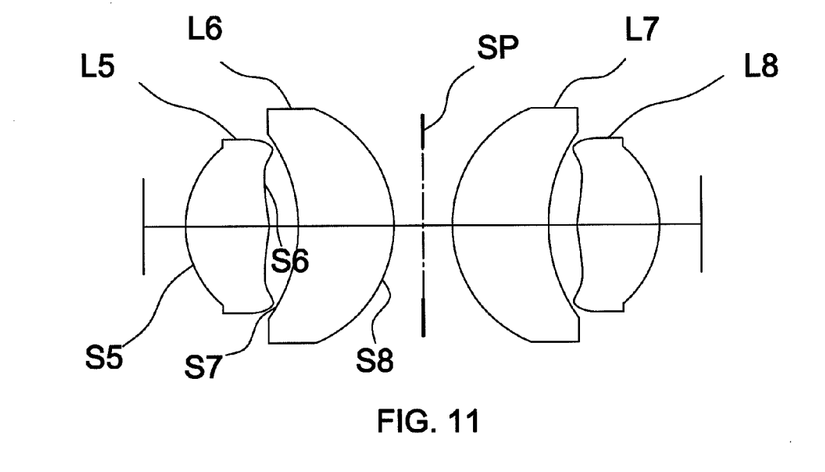

According to the above embodiments, the composition of the lens assembly in the dual lamp illumination system is not limited. As long as two identical sets of varifocal lenses are provided and positioned substantially in symmetry, the light collection angle of the integration rod 28 is allowed to be optimized. As shown in FIG. 10, the lens assembly 22 includes lenses L1, L2, L3 and L4. The lens L1 and lens L4 are identical in structure, and they are located in symmetry relative to an aperture stop SP before the focus adjustment is made. The lens L2 and lens L3 are identical in structure, and they are located in symmetry relative to the aperture stop SP before the focus adjustment is made. The radius curvature of a surface S1 of the lens L1 is −61.835 mm, and the radius curvature of a surface S2 of the lens L1 is −17 mm. The radius curvature of a surface S3 of the lens L2 is 589.848 mm, and the radius curvature of a surface S4 of the lens L2 is −28.887 mm. In an alternate embodiment shown in FIG. 11, the lens assembly 22 includes lenses L5, L6, L7 and L8. The lens L5 and lens L6 are identical in structure, and they are located in symmetry relative to an aperture stop SP before the focus adjustment is made. The lens L7 and lens L8 are identical in structure, and they are located in symmetry relative to an aperture stop SP before the focus adjustment is made. The radius curvature of a surface S5 of the lens L5 is 14.667 mm, and the radius curvature of a surface S6 of the lens L5 is −19.174 mm. The radius curvature of a surface S7 of the lens L6 is −22.64 mm, and the radius curvature of a surface S8 of the lens L6 is −18.15 mm.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A dual lamp illumination system, comprising:
 a first light source and a second light source located in different positions, the first light source being capable of emitting a first light beam and the second light source being capable of emitting a second light beam;
 a light-deflecting device positioned in a first light path of the first light beam to reflect the first light beam and in a second light path of the second light beam to reflect the second light beam, so that the first light beam is combined with the second light beam to form a combined light beam;
 a light-homogenizing device being capable of receiving and homogenizing the combined light beam; and
 a lens assembly disposed between the light-deflecting device and the light-homogenizing device and comprising a first set of varifocal lenses neighboring the light-deflecting device and a second set of varifocal lenses neighboring the light-homogenizing device, wherein the first set of varifocal lenses and the second set of varifocal lenses are positioned substantially in symmetry, the first set of varifocal lenses comprises, numbered in order of location from the light-deflecting device to the light-homogenizing device, a first lens and a second lens, the second set of varifocal lenses comprises, numbered in order of location from the light-deflecting device to the light-homogenizing device, a third lens and a fourth lens, the position of the first lens is fixed, and the positions of the second lens, the third lens, and the fourth lens are adjustable in the lens assembly.

2. The dual lamp illumination system as claimed in claim 1, wherein a first side surface of the light-deflecting device faces the first light source, and a second side surface of the light-deflecting device faces the second light source.

3. The dual lamp illumination system as claimed in claim 2, wherein each of the first side surface and the second side surface is applied with a reflective coating.

4. The dual lamp illumination system as claimed in claim 2, wherein the first side surface and the second side surface are substantially perpendicular to each other.

5. The dual lamp illumination system as claimed in claim 1, wherein the light-deflecting device is a light-combining prism.

6. The dual lamp illumination system as claimed in claim 1, wherein the light-deflecting device is substantially positioned in a connecting line between the first light source and the second light source.

7. The dual lamp illumination system as claimed in claim 6, wherein the combined light beam is capable of propagating in a first direction, and the first direction is substantially perpendicular to the connecting line between the first light source and the second light source.

8. The dual lamp illumination system as claimed in claim 1, wherein the first lens is identical to the fourth lens in structure, and the second lens is identical to the third lens in structure.

9. The dual lamp illumination system as claimed in claim 1, wherein the light-homogenizing device is an integration rod.

10. A varifocal light-mixing device, comprising:
a light-deflecting device having a first side surface facing a first light source and a second side surface facing a second light source, the light-deflecting device being positioned in one of a first light path of a first light beam emitted from the first light source and a second light path of a second light beam emitted from the second light source to reflect one of the first light beam and the second light beam;
a light-homogenizing device being capable of receiving and homogenizing one of the first light beam and the second light beam; and
a lens assembly disposed between the light-deflecting device and the light-homogenizing device to adjust a light collection angle of the light-homogenizing device, the lens assembly comprising a first set of varifocal lenses neighboring the light-deflecting device and a second set of varifocal lenses neighboring the light-homogenizing device, wherein the first set of varifocal lenses and the second set of varifocal lenses are positioned substantially in symmetry, the first set of varifocal lenses comprises, numbered in order of location from the light-deflecting device to the light-homogenizing device, a first lens and a second lens, the second set of varifocal lenses comprises, numbered in order of location from the light-deflecting device to the light-homogenizing device, a third lens and a fourth lens, the position of the first lens is fixed, the positions of the second lens, the third lens, and the fourth lens are adjustable in the lens assembly, and the light-deflecting device is movable to adjust the light amount of one of the first light beam and the second light beam received by the light-homogenizing device.

11. The varifocal light-mixing device as claimed in claim 10, wherein each of the first side surface and the second side surface is applied with a reflective coating.

12. The varifocal light-mixing device as claimed in claim 10, wherein the first side surface and the second side surface are substantially perpendicular to each other.

13. The varifocal light-mixing device as claimed in claim 10, wherein the light-deflecting device is a light-combining prism.

14. The varifocal light-mixing device as claimed in claim 10, wherein the light-deflecting device is substantially positioned in a connecting line between the first light source and the second light source.

15. The varifocal light-mixing device as claimed in claim 14, wherein one of the first light beam and the second light beam is capable of propagating in a first direction, and the first direction is substantially parallel to the connecting line between the first light source and the second light source.

16. The varifocal light-mixing device as claimed in claim 10, wherein the first lens is identical to the fourth lens in structure, and the second lens is identical to the third lens in structure.

17. The varifocal light-mixing device as claimed in claim 10, wherein the light-homogenizing device is an integration rod.

* * * * *